No. 781,783.                                              Patented February 7, 1905.

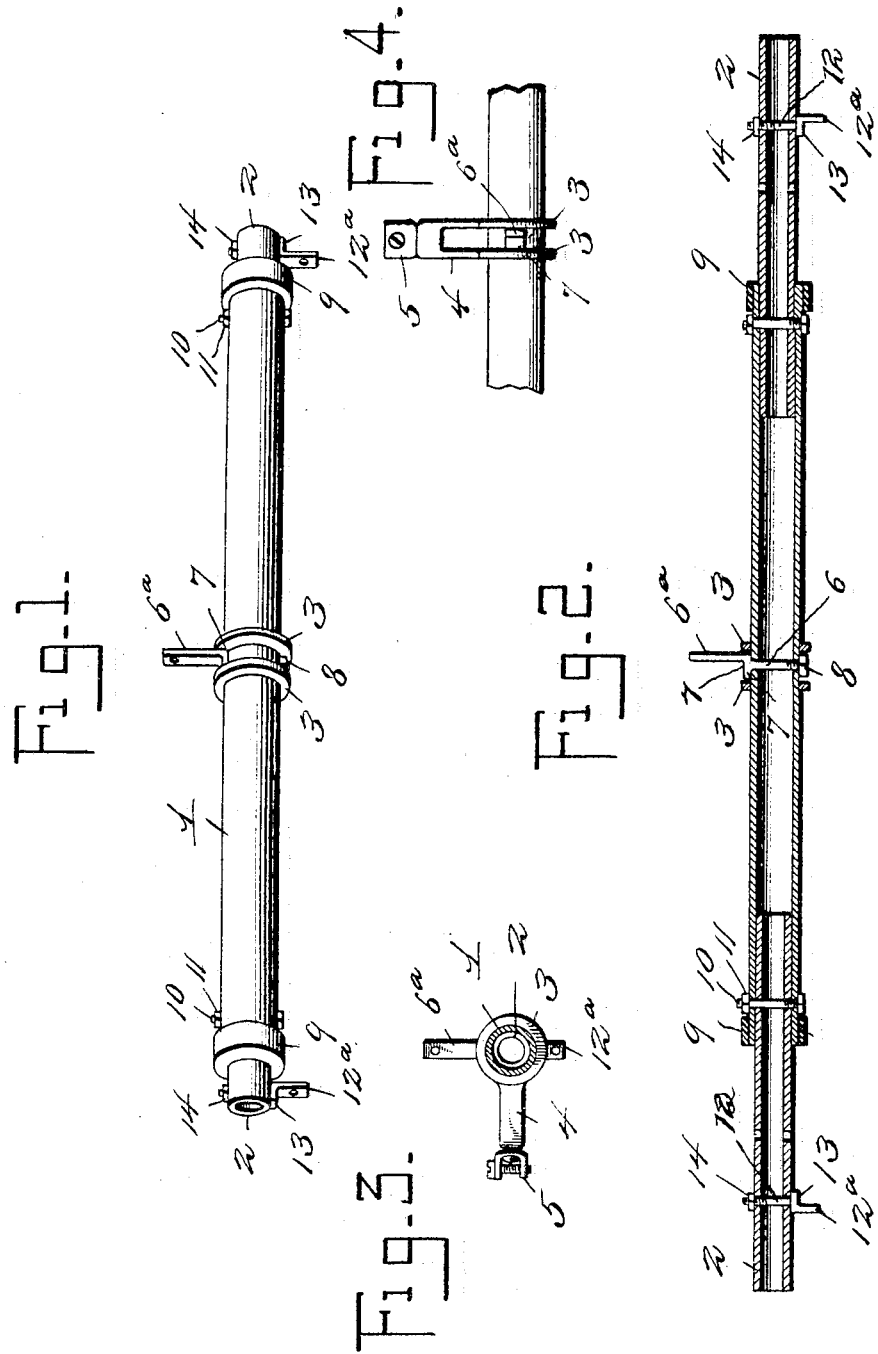

UNITED STATES PATENT OFFICE.

ROBERT NEWTON, OF JERSEYVILLE, ILLINOIS.

DRAFT-EQUALIZER.

SPECIFICATION forming part of Letters Patent No. 781,783, dated February 7, 1905.

Application filed May 26, 1904. Serial No. 209,889.

*To all whom it may concern:*

Be it known that I, ROBERT NEWTON, a citizen of the United States, residing at Jerseyville, in the county of Jersey and State of Illinois, have invented a new and useful Draft-Equalizer, of which the following is a specification.

This invention relates to draft-equalizers.

The object of the invention is to enable draft to be equalized between two, three, or more draft-animals in a simple and effective manner by employing a whiffletree comprising several members telescoping together and provided with radially-extending arms or levers for the attachment of the draft, the equalization of the draft being effected by the relative length of said levers, whereby the draft is attached at different distances from the axis of the whiffletree, the latter being supported rotatably in suitable bearings.

The invention consists specifically in the improved construction and novel arrangement and combination of parts, which will be hereinafter fully described, and particularly pointed out in the claims.

In the accompanying drawings has been illustrated a simple and preferred form of embodiment of the invention, it being understood, however, that no limitation is necessarily made to the precise structural details therein exhibited, but that the right is reserved to any changes, alterations, and modifications to which recourse may be had within the scope of the invention and without departing from the spirit or sacrificing the advantages of the same.

In said drawings, Figure 1 is a perspective view of a whiffletree constructed in accordance with the principles of the invention. Fig. 2 is a longitudinal sectional view showing the end members of the whiffletree extended. Fig. 3 is a cross-section taken near the center of the whiffletree. Fig. 4 is a plan view showing the central portion of the whiffletree.

Corresponding parts in the several figures are indicated by similar numerals of reference.

In carrying out this invention a central tubular member 1 is employed, consisting, preferably, of a metal tube, such as an ordinary gas-pipe, of suitable dimensions. End members 2 2, which may likewise be tubular, are mounted to telescope in the ends of the supporting-tube 1. The latter is rotatably mounted in a pair of supporting-rings 3 3, connected by a shackle 4, having a swivel connection with a shackle 5, which latter is adapted for connection of the whiffletree with the vehicle to which draft is to be applied.

The tube 1 is centrally perforated for the passage of a rod or bar 6, having a shoulder or abutment 7 and provided with a screw-threaded end upon which the nut 8 is mounted. The projecting end of the rod or bar 6 constitutes a lever $6^a$, which is perforated near its outer end for the attachment of draft.

The main tube 1 is provided at the ends thereof with reinforcing-bands 9. Adjacent to said bands are perforations for the passage of bolts 10, having nuts 11, said bolts also passing through suitably-disposed perforations in the extension members 2 2, which are thereby retained at proper adjustment, each of said tubes being provided with a plurality of perforations for the passage of the connecting-bolts. Each of said extension members is also provided with perforations for the passage of a transverse rod or bar 12, having a shoulder or abutment 13 and a screw-threaded end upon which a securing-nut 14 is mounted. The oppositely-extending ends of the rods or bars 12 constitute levers $12^a$, which are perforated near their outer ends for the attachment of the draft. The lever members $12^a$ will in practice be made about one-half the length of the central lever member $6^a$. The latter being disposed between the supporting-rings 3 3 will serve to retain the tubular member 1 in its proper position and prevent it from being displaced laterally in said supporting-rings.

The operation of this invention will be readily understood from the foregoing description, taken in connection with the drawings hereto annexed. When the extension members 2 2 are telescoped within the central tube 1, the device may be utilized as a swingletree by simply attaching draft to the ends of the lever members $12^a$, or it may be utilized as a doubletree by attaching swingletrees to said lever members. When a tripletree is required, the end members 2 are extended, as shown in Fig. 2, and secured by the bolts 10 in such a manner that the lever members 12ª and 6ª will extend in opposite directions from the axis of the device. A horse attached to the long lever 6ª will thus have the advantage of leverage against two horses attached to the end levers 12ª, the entire device being mounted rotatably in the bearings 3, as will be readily understood.

By properly manipulating the device it may be used in a variety of ways which will readily suggest themselves to the operator.

This improved device has the advantages of cheapness and simplicity and of ease of adaptation to the draft that is to be utilized.

Having thus described the invention, what is claimed is—

1. A whiffletree mounted for rotation, extension members connected therewith, and equalizing-levers for the attachment of draft extending radially from the whiffletree and its extensions in directions other than the line of draft.

2. A tubular whiffletree mounted for rotation, extension members telescoping therein, and equalizing-levers for the attachment of draft extending radially from the whiffletree and from the extension members in directions other than the line of draft.

3. A tubular whiffletree mounted for rotation, end sections telescoping in said tubular whiffletree, means for securing said end sections at various adjustments, rods extending transversely through the end sections and provided with abutments and with extensions forming radially-extending levers, and a rod extending transversely through the tubular whiffletree and having an abutment and an extension constituting a radially-extending lever.

In testimony that I claim the foregoing as my own I have hereto affixed my signature in the presence of two witnesses.

ROBERT NEWTON.

Witnesses:
JOHN A. PERRINGS,
JNO. G. BLISH.